United States Patent [19]

Castro

[11] Patent Number: 4,618,742
[45] Date of Patent: Oct. 21, 1986

[54] METHOD AND APPARATUS FOR DECODING AUDIOFREQUENCY INFORMATION SENT THROUGH ROTARY DIALING

[76] Inventor: Horacio Castro, El Salvador 5962, Buenos Aires (1414), Argentina

[21] Appl. No.: 479,026

[22] Filed: Mar. 25, 1983

[30] Foreign Application Priority Data

Mar. 31, 1982 [AR] Argentina ............................ 288969

[51] Int. Cl.⁴ .......................................... H04M 11/00
[52] U.S. Cl. ................................ 179/2 A; 179/84 VF
[58] Field of Search ............... 179/2 DP, 2 CA, 2 A, 179/2 AM, 5.5, 6.11, 84 R, 84 C, 84 VF, 84 A, 84 T, 81 R, 90 B-90 BD

[56] References Cited
U.S. PATENT DOCUMENTS 4,006,316  2/1977  Bolgiano ........................ 179/2 A X
4,121,053  10/1978  Dick .................................. 179/2 A
4,446,339  5/1984  Bolgiano ........................ 179/2 A X Primary Examiner—James L. Dwyer
Attorney, Agent, or Firm—Fleit, Jacobson, Cohn & Price

[57] ABSTRACT

The present invention provides a method and apparatus for decoding audiofrequency information sent through rotary dialing from a calling phone set or through any other phone dialing generating means, as they are currently found in the form of automatic rotary dialers, during the conversation period established between a calling phone set and the apparatus of the present invention located at the called end.

At the same time in which the closure of the d.c. current or conversation circuit takes place, a decoder apparatus is activated at the called party end for decoding the audiofrequency information sent through rotary dialing by the calling party and transforming it into logic data or single pulses for purposes of commanding, ordering or informing.

9 Claims, 4 Drawing Figures

METHOD AND APPARATUS FOR DECODING AUDIOFREQUENCY INFORMATION SENT THROUGH ROTARY DIALING

BACKGROUND OF THE INVENTION

The field of the invention corresponds to the phone communications art and it is particularly based on the utilization of the transmission of audiofrequency information through rotary dialing from a calling phone set after closure of the d.c. current or conversation circuit established with the called party.

DESCRIPTION OF THE PRIOR ART

It is already known that the transmission of phone pulse trains can be accomplished by interrupting a carrier which may be transmitted through cable or air.

Also, the timing of the impulses from rotary phones is well known.

Further, the technology of converting analog information into digital data is widely known.

And, lastly, the present disclosure applies the universally known SCHMITT-TRIGGER, in this case used as a level comparator.

SUMMARY OF THE INVENTION

In accordance with the main feature of the method proposed in the present invention and bearing in mind that the calling party is aware of the code to be used when the communication is to take place and, on the other hand, that the called party is in possession of the apparatus of the invention, said method comprises the steps of: sending from the calling end of a phone line the series of characters corresponding to the phone number of the called party; after closure of the d.c. current circuit of the called party's phone line, sending audiofrequency signals through rotary dialing from the calling party's end; decoding said audiofrequency signals with the apparatus at the called party; transforming said decoded audiofrequency signals into logic data or into single pulses; and, finally, applying said logic data or single pulses to commanding, ordering or informing means.

Basically, the proposed apparatus has an input signal limiter to protect its circuits, using for such purposes an adjustable trimmer to establish the proper threshold. The limiter's output is connected to an operational amplifier and to filters suitable for recovering the significant or useful portion of the audiofrequency signals to be analyzed, eliminating the noise components and non-desired signals which may appear in the phone line.

Signals thus produced by the operational amplifier and suitably filtered are introduced into a rectifier circuit, which emits a rectified output of said signals to be analyzed, thus eliminating one of the semi-cycles or half-waves of said signals. The output of said rectifier is introduced into a SCHMITT-TRIGGER which converts said signals into square wave signals, establishing their amplitude at certain levels, this requirement due to the wide dynamic range offered by said audiofrequency signals.

The output of the SCHMITT-TRIGGER is introduced into a microprocessor that works as an interval comparator and time analyzer. This microprocessor determines, through an accurate measurement of times, the equivalence between the audiofrequency signals generated by a rotary phone and the succession of pulses that make up a pulse train per each dialed character or number.

The microprocessor is capable of determining when a train of phone pulses has been completed and ignoring audiofrequency signals which are false or unnecessary for the decoding of rotary dialed phone pulses. Said false or undesired signals, for the purpose of the proper decoding of phone pulses, may be present on the phone lines as a result of the rotary phones themselves, from which the decoder apparatus of this invention receives audiofrequency signals, or may be caused by echoes or noises inherent in telephone lines.

The decoder apparatus of the invention consists of a device capable of converting certain audiofrequency signals into logic data or into single pulses. In the conversation state (closed d.c. current circuit), phone pulses do not operate in the rotary dialing mode prior to the establishment of the conversation, that is, by sending d.c. current pulses, but due to the inductive-capacitive connection between both phone sets in conversation and the exchange. It is only possible to transmit audiofrequency signals produced by the operation of a rotary phone after the inductive-capacitive connection has been established.

Audiofrequency signals, produced by a rotary phone and captured by the decoder apparatus during predetermined time spaces, allow conversion to logic data or single pulses of the number or character sent through rotary dialing.

For example, if the number "3" is dialed, the decoder apparatus receives the audiofrequency signals produced by the rotary phone with the characteristics inherent to its maintenance condition, its system, brand, etc. These audiofrequency signals normally appear within certain time periods (in this example, we refer to those phone systems which operate with a pulse rate wherein the number "0" will originate ten pulses with an approximate duration each of 100 milliseconds). Said audiofrequency signals are transformed into square wave signals in order to allow their digital processing (by means of the microprocessor in said decoder apparatus) and are then transformed into logic data or into single pulses.

Said audiofrequency signals (in this example originated by rotary dialing of number "3") are captured by applying the method disclosed in this invention, in the following predetermined time periods:

(A) As from the reception of the first audiofrequency signal (produced by the beginning of the first phone pulse configuration) and after a first time period of approximately 50 milliseconds, another audiofrequency signal originated in the final configuration of the first phone pulse shall appear within a second time period initiated as from when said 50 millisecond time period has elapsed, this second time period being of an approximate duration of 30 milliseconds. The decoder apparatus converts said first audiofrequency signals into logic data or into a single pulse.

(B) The next audiofrequency signal originated by the second phone pulses appears after a third time period of approximately 30 milliseconds, initiated with the capturing of the second audiofrequency signal mentioned in (A), and within a fourth time period initiated after the third time period has elapsed, said fourth time period having a duration of approximately 50 milliseconds.

Upon receipt of this new audiofrequency signal, another period is initiated of approximately 50 milliseconds such as indicated in (A), after which the signal necessary for converting into logic data or into a single pulse the audiofrequency information originated by the second phone pulse produced by the rotary phone appears in the second time period of approximately 30 milliseconds.

(C) The sequence is repeated, converting the audiofrequency signals corresponding to the third phone pulse and appearing within the time periods indicated in (B) into other logic data or into a single pulse.

This example refers to the decoding of audiofrequency signals originated by the rotary dialing of number "3". Therefore, when, after receipt of the third rotary pulse the following fourth time period elapses, initiated as from the ending of the previous third time period, no other audiofrequency signal will appear within the approximately 50 milliseconds of the fourth time period. The decoder apparatus will neither capture a new audiofrequency signal nor generate new logic data or another single pulse during this time period.

In the approximately 300 millisecond time period immediately following said 50 millisecond last fourth time period, the decoder will neither accept nor convert into logic data or into single pulses other audiofrequency signals, since the ending of the phone pulse train originated in the rotary dialing of number "3" has taken place. In the above mentioned example, the decoder has converted into logic data or into single pulses the audiofrequency signals produced by a three-phone pulse train (rotary dialing of number "3").

DETAILED DESCRIPTION OF THE DRAWINGS

Figure 1:
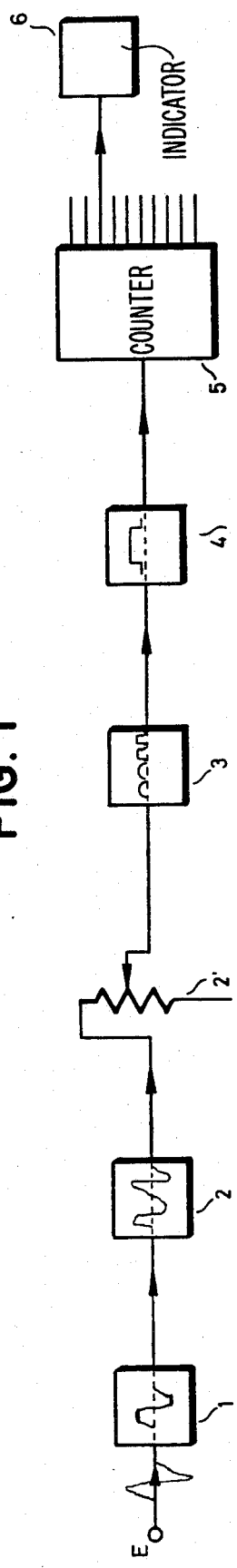
FIG. 1 shows a block diagram of the basic apparatus for recognizing the presence of a phone pulse train in the form of audiofrequency signals, originated through rotary dialing on a phone line after closure of the d.c. current circuit.

Let us now describe in detail FIG. 1, bearing in mind that what is wanted is to recognize the presence of a phone pulse train when said pulses appear as audiofrequency signals after the conversation period has been established.

The phone line is connected to input E of block 1, which includes an input limiter or trimmer intended to prevent the overloading of the subsequent circuits in the cases of phone pulses signals with higher levels than those set by said trimmer.

Audiofrequency signals thus processed are applied to circuit or block 2, which includes a series of amplifiers and bandpass filters intended for recovering, within the audiofrequency spectrum present in the signals produced by phone pulse trains, the most significant and available portions of these signals.

The output of block 2 is coupled to the input of block 3 after the incorporation of a level regulator 2'.

This regulator is intended for maintaining a certain level of the audiofrequency signals before they enter circuit or block 3, and its adjustment depends on the conditions offered by the phone lines making up the communication between the phone set generating the call and the referenced decoder apparatus, as well as on the characteristics of the exchanges engaged in said communications. The system thus conceived is intended for obtaining correct decoding or recognition of the signals produced by phone pulses, based on a preadjustable level of said signals.

The signals, after their adjustment by means of regulator 2', enter input of block 3, which includes a SCHMITT-TRIGGER. The rectifier portion thereof is intended for recovering only the positive portion of the audiofrequency signal cycles.

Signals thus rectified are introduced into the SCHMITT-TRIGGER in order to transform them into square waves, this being the only form of energy which can be introduced into digital logical elements in order to process their levels and times.

Square wave signals present at the output of block 3 enter the integrator 4. The integrator which has, as an essential purpose, the conversion of the two consecutive square wave signals corresponding to the audiofrequency signals produced by each phone pulse into a single pulse. The integrator may be embodied as a microprocessor as discussed with respect to FIG. 2. Said conversion requires microprocessor to analyze times and compare intervals. If the time period between the first and second square wave signals coming from the trigger ranges from 50 to 80 milliseconds, the microprocessor generates a single pulse. Likewise, microprocessor interprets the end of a pulse train and stops processing information when, after receiving a second square wave signal within the time period ranging from 50 to 80 milliseconds (approximately) as from the appearance of the first square wave signal it does not detect the presence of a new square wave signal within the time period ranging from 30 to 80 milliseconds (approximately) as from the appearance of said second square wave signal and thus, it is inhibited from processing information coming from the trigger during a time period of approximately 300 milliseconds, in order to prevent the detection of noises, erratic pulses, etc.

For certain phone pulse systems, the inter train inhibit time can be extended to, e.g., 1.4 seconds. The microprocessor is set in such a way that it only interprets as a true phone pulse that being determined by the capture of square wave signals within the time periods set forth in the method disclosed in the present invention. For instance, if a square wave signal supposedly originated in an audiofrequency signal produced by a rotary phone enters the microprocessor and, after a 50 (approximately) millisecond time period has elapsed and within a subsequent 30 millisecond time period, no other square wave signal is captured, the microprocessor ignores said square wave signal and does not therefore generate a single pulse.

Square wave signals transformed into single pulses by block 4 enter the decimal-type counter 5 having, e.g., ten outputs. In this particular case, it can be seen that one of said outputs has been connected to an availability or received pulse indicator means 6.

Figure 2:
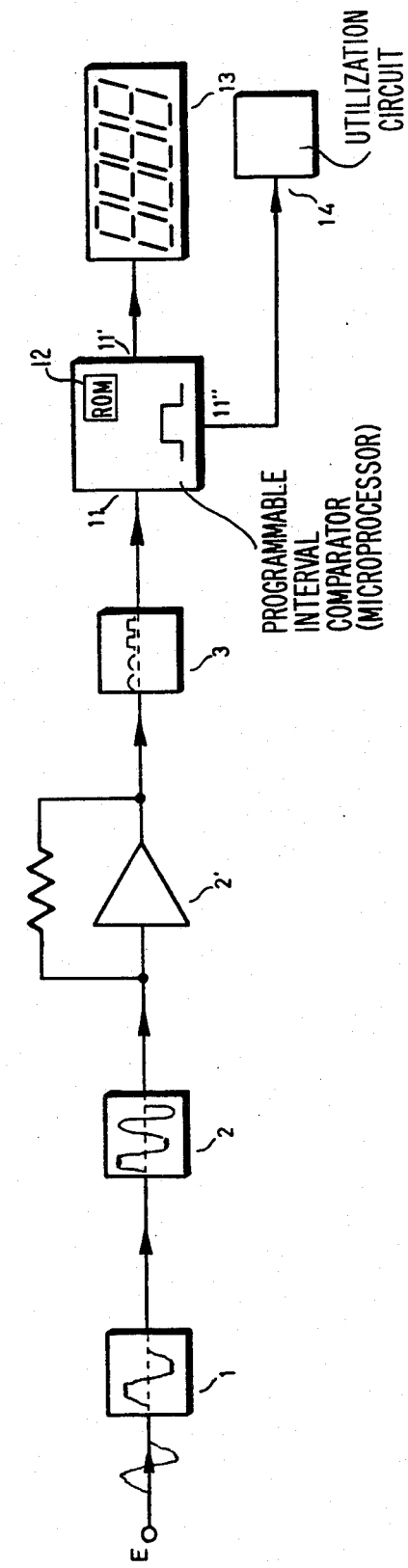
FIG. 2 is a block diagram showing how the apparatus recognizes phone pulses in the form of audiofrequency signals originated through rotary dialing on a phone line after closure of the d.c. current circuit and converts said signals into binary-type information.

In FIG. 2, blocks 1, 2 and 3 have characteristics and functions identical to those previously described for FIG. 1. In this configuration, signal level regulator 2' has been replaced by a follower-mode connected operational amplifier.

Amplifier 2' has a unitary amplification factor and, thus, performance of this decoder configuration is independent from the signal levels present in the communication between the signal generating calling phone set and the decoder.

In the example illustrated in FIG. 2, programmable interval comparator 11 is composed of timers which time constants are regulated by a time or clock signal-based generator. The programmable comparator is embodied as a microprocessor (in this context, the word "microprocessor" means the electronic component proper plus the peripheral circuits and at least ROM memory 12). The difference between FIG. 1 and FIG. 2 is that microprocessor 11 not only converts the square wave signals, but also compares them with a four digit code stored in ROM 12.

Output 11' of microprocessor 11 enters a four-digit display 13. On the other hand, microprocessor 11 controls through its output 11" the utilization circuit represented by block 14.

When the logic data obtained through pulse train decoding or recognition —4 pulse trains in our example-coincides with the data stored in a said associated memory, their characters are displayed in 13 and, further, output 11" of said microprocessor 11 will present logic outputs activating utilization circuit 14. As soon as the decoding of the four pulse trains takes place, microprocessor 11 is inhibited from decoding additional pulse trains.

On the other hand, this arrangement enables display 13 to exhibit any character or number corresponding to each decoded pulse train, even though there is no coincidence between the latter and the data stored in the associated memory, therefore not activating utilization circuit 14.

Figure 3:
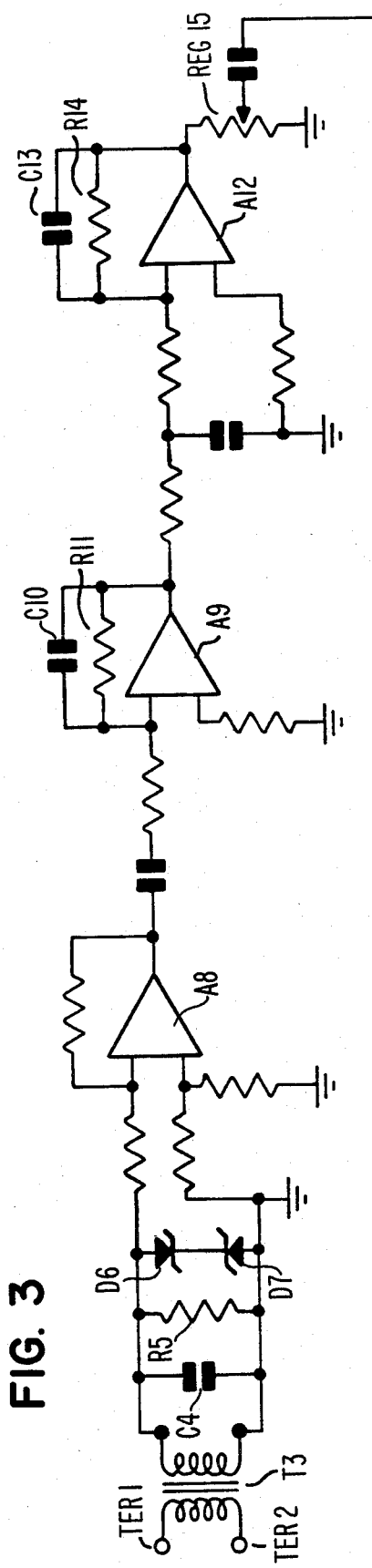
FIGS. 3 and 4, respectively, illustrate the main circuitry as to how the block diagrams of FIGS. 1 and 2 can be carried into practice.
Figure 3:
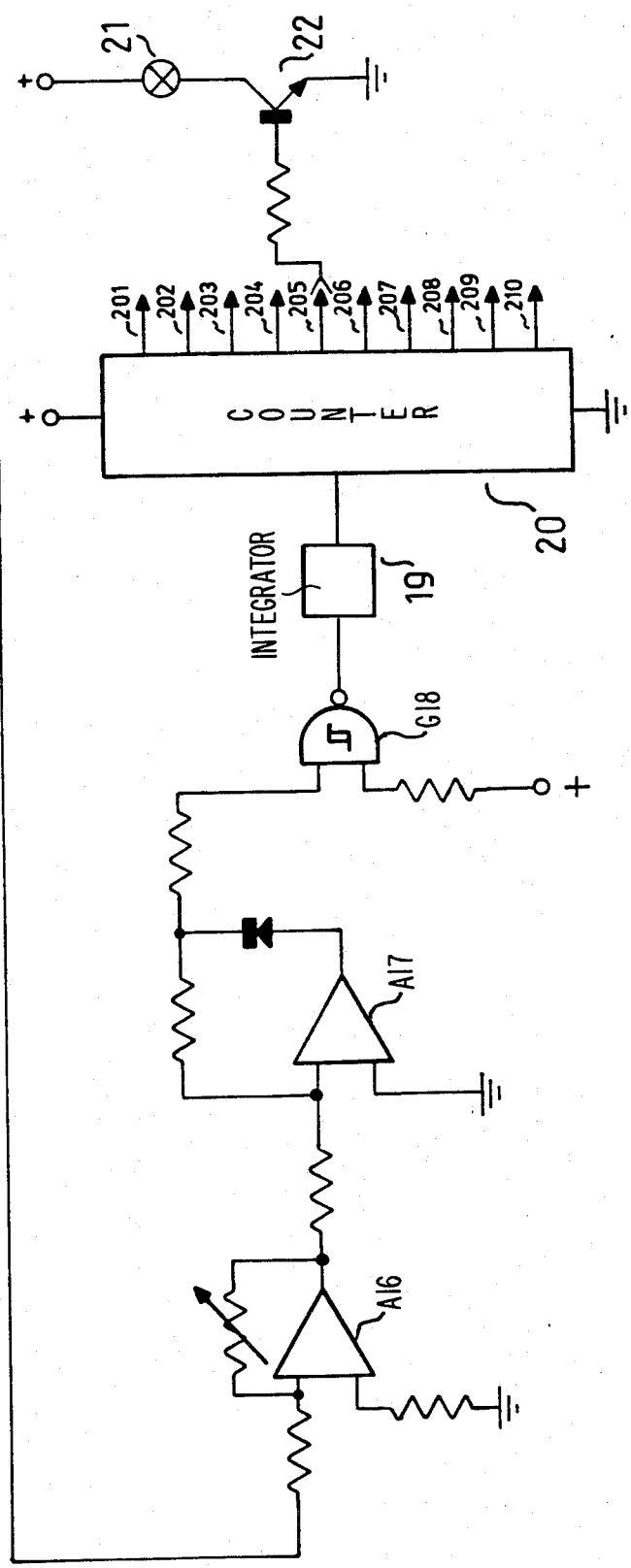

FIG. 3 represents a practical display of the block diagram of FIG. 1; therein the phone line enters coupling transformer 3 through terminals TER 1 and TER 2.

Transformer T3 has an impedance equal to or approximate to that of a common phone set with its receiver unhooked. One terminal of said transformer is ground-connected in order to allow its coupling to the input of operational amplifier A8; thus the return of all signals being processed by the apparatus is connected to a common point or ground.

Capacitor C4 and resistor R5 form the first input filter for trimming or attenuating the most significant portion of the signals in their high-frequency spectrum.

Zenner-type diodes D6 and D7 restrict the amplitude of the signals produced by phone pulses to a certain value with the object of protecting the first operational amplifier A8. This amplifier is configured in the follower or buffer mode, thus presenting no amplification factor.

Audiofrequency signals enter a cascade made up of the two operational amplifiers A9 and A12. The configuration of these two amplifiers results in a bandpass-type filter, the response of which is determined by capacitors C10 and C13 and by resistors 11 and 14. The function of this filter, as explained in the above disclosure comment, is that of recovering the most significant or useful portions of the signals to be analyzed, and eliminating the extraneous signals and noise components accompanying the phone pulses.

Filtered signals are then sent to amplifier A16 through variable resistor level regulator REG 15. The audio level and gain factor of amplifier A16 depend on the conditions of the phone line to which the apparatus is connected, as well as on the attenuation factors presented by phone nets.

The output of the amplifier A16 is connected to the input of amplifier A17, the circuit configuration of which allows the rectified output of the signals to be analyzed, therefore eliminating one of the semi-cycles of said signals. For example, positive semi-cycles enter one of the inputs of gate G18, which is of the NAND-SCHMITT-TRIGGER type, with the object of converting the analog character of the signals into square waves, this condition being indispensable to their use in digital processing components. The remaining input of gate G18 is set to a certain bias so that said gate works as a level detector or threshold detector. This configuration supplements what has been described for the operating characteristics of amplifier A16. The reason for setting a level for signal detection, by gate G18, is due to the presence of the high dynamic range which phone pulses have, in the form of audiofrequency signals.

Each phone pulse originated by the operation of the dial of a rotary phone set on a phone line in a conversation state, consists of two signals, one corresponding to the time the contact opens and the other corresponding to the time the contact closes. This means that, at the output of gate G18, we have for each signal received at the input of the apparatus, two successive square wave signals which are produced within a time period of approximately 80 milliseconds.

In the previous comments relative to the disclosure of this invention, a microprocessor working as an interval comparator or time analyzer was mentioned. In each application circuit where electronic technology intervenes, it is possible to compare times or measure events of any type with absolute precision only if they are compared to a time basis or clock signal of utmost accuracy. This type of circuitry cannot be based on time constants set by means of capacitors and resistors, even though they may be of the highest dependability. In order to obtain an accurate and dependable decoder apparatus, it is necessary to include therein programmable timers, a time base or piezoelectric crystal produced clock signal, and, if high precision and absolute dependability are to be achieved, use of the modern technology offered by a microprocessor should be included, the latter being used in the present invention The above stated indications respond to the fact that accurately decoding phone pulse train characters transmitted through a phone circuit in the conversation state can only be achieved with fidelity provided their times are measured in all their processes.

The essential parameters on which the decoding of phone pulses thus originated are based are the following:

(A) Analysis of the transition time period between two audiofrequency signals originated at the point of transmission of the rotary phone. A rotary phone produces two audiofrequency signals within an approximately 80 millisecond interval per each phone pulse, the precise time depending on the phone system used.

Thus the single pulse produced by the microprocessor within the approximately 80 millisecond time period is valid because the apparatus detects the presence of two successive signals, the rising fronts of which take place within an approximately 80 millisecond time period. Erratic signals or the presence of a single signal in the apparatus are not considered valid, since they do not represent a real opening-closure in a rotary phone.

(B) Analysis of pulse train time. We refer to the pulse train as the succession or times a rotary phone contact opens and closes the phone circuit. That is to say, if the phone dial, on its backward motion, produces three successive opening-closures, it means that whoever has operated it has dialed digit "3" (decoding of audiofrequency signals produced by rotary dialing number "3" has been described in SUMMARY OF THE INVENTION).

In the case of transmitting through a rotary phone characters or digits on a circuit in a conversation state, at the reception point, in our case, at the decoder apparatus input we find that every time a character or digit is received, the phone pulse (or each one of the phone pulses) is divided into two audiofrequency signals.

As noted in (A) above, the device interprets or analyzes the transition period between two successive signals, the rising fronts of which take place within an approximately 80 millisecond time period.

The decoder apparatus interprets when any phone pulse train has finished, as described at the SUMMARY OF THE INVENTION and in the detailed description of FIG. 1.

For the purpose of performing the processing of the pair of square wave signals present at the output of gate G18, said signals enter integrator 19, the output of which offers a single pulse per each pair of incoming square wave signals. Said single pulse is used to command the decimal-type counter 20. The latter has an "n" output capacity. A switching transistor 22 and a luminous indicator 21 are connected at output 205 of counter 20. The configuration thus constituted results in the activation of luminous indicator 21 if the audiofrequency signals corresponding to the number 5 pulse train produced by a rotary phone set enter terminals 1 and 2 of the apparatus.

Figure 4:
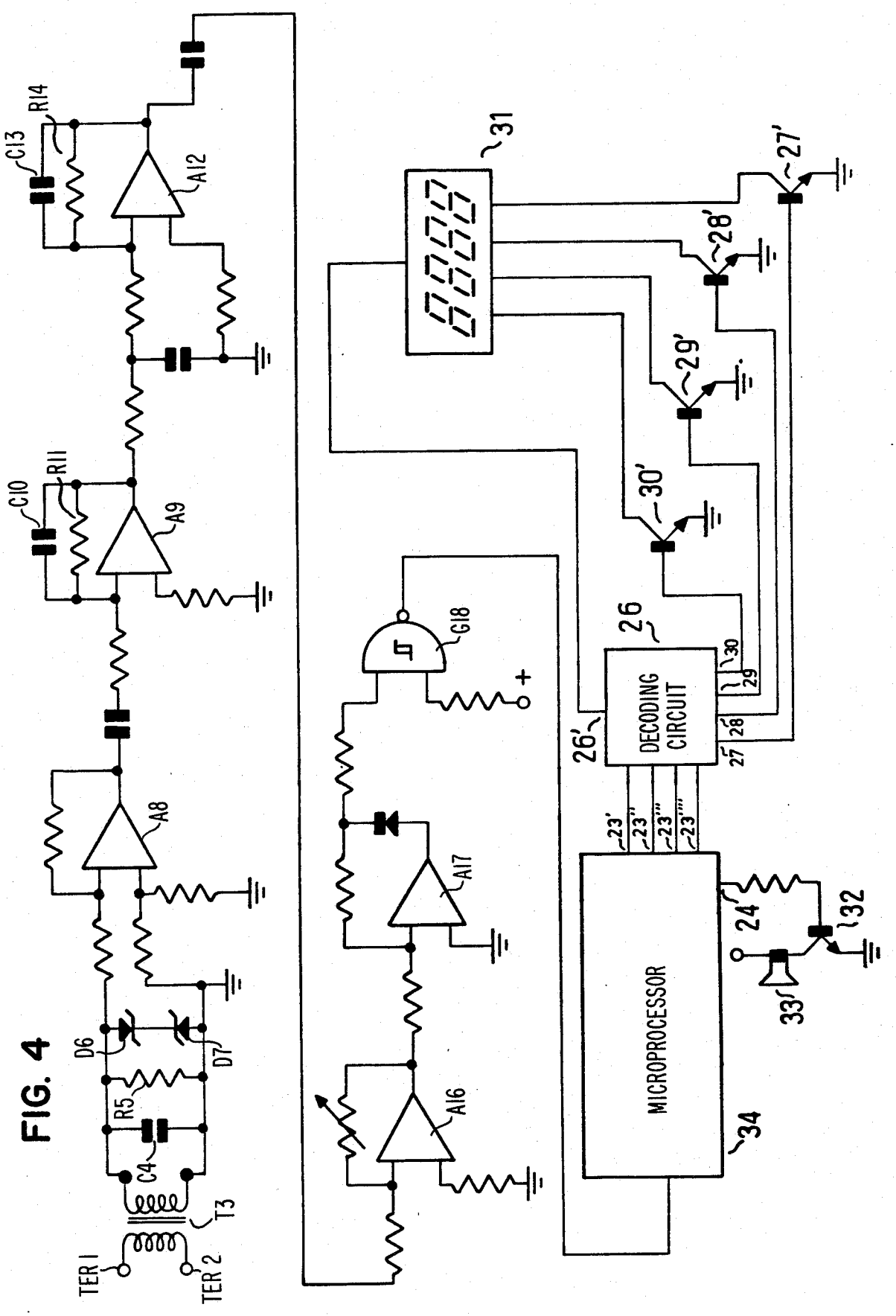

Finally, FIG. 4 represents a practical display of the FIG. 2 block diagram. FIG. 4 shows a circuit variation from the NAND-SCHMITT-TRIGGER gate G18. Output of the latter enters microprocessor 34. Said microprocessor decodes square wave signals originating from audiofrequency signals produced by phone pulse trains in the same way as described for FIG. 3 and the SUMMARY OF THE INVENTION. PUlses present at the gate G18 output enter microprocessor 34 which transforms square wave signals into binary information. Said binary information shows up at outputs 23', 23", 23''' and 23'''' of microprocessor 34. Said outputs are connected to decoder circuit 26 which is of the binary to seven segments exciter type. Output 26' of decoder 26 produces the excitation of each one of the display 31 seven segment indicators, whereas transistors 30', 29', 28' and 27' are programmed so as to keep the indicator in the latch state.

The decoded information is also compared in one of microprocessor 34 associated memories. In the latter, the logic data corresponding to, e.g., four decoded pulse trains are compared. In case said logic data stored in said memory coincides with the logic data corresponding to the decoded phone pulse trains, microprocessor 34 provides at its output 24 logic signals which produce acoustic signals through transistor 32 and piezoelectric buzzer 33. It must be remembered that numeric indicator 31 is always enabled to exhibit any decoded character or number, even though the latter does not correspond to logic data stored in one of said microprocessor 34 associated memories.

Upon the decoding of the four pulse trains, microprocessor 34 is inhibited from decoding additional pulse trains. This is due to the fact that the numeric indicator 31 illustrated in the present arrangement only has 4 digits.

Likewise, due to the great operative capacity of a microprocessor, a large number of logic outputs could be obtained, which, in accordance with the established programs, could be devoted to the control of several functions which we do not need to describe in this specification.

An example of the possibilities that a microprocessor can offer for the decoding of phone pulses is that of varying the time constants in order to capture square wave signal rising fronts.

This possibility can be employed when the phone pulse speed is unusual or when mechanical or electronic generators with a rhythm different to that of conventional phone sets are employed for the transmission of dialing pulses or characters.

The same possibilities could be applied to the stated 300 millisecond to 1.4 second times.

The conventional exchanges accept up to 450 milliseconds as the so called interdigital time.

The preferred configurations of the apparatus for putting into practice the proposed method have been fully described and experts in the art will easily understand that variations or component substitutions can be effected, which, notwithstanding, are included within the spirit and scope of the present invention as defined in the annexed claims.

What is claimed is:

1. A method for decoding audiofrequency information sent through rotary dialing from a calling phone set during the conversation period established over a phone line with a called party, wherein said method comprises the steps of:
　(A) sending from the calling end of said phone line the series of characters corresponding to the phone number of the called party, and, after closure of the d.c. current or conversation circuit;
　(B) sending said audiofrequency information through rotary dialing from the calling party;
　(C) decoding said audiofrequency information at the called party, said decoding comprising the steps of:
　　(1) substantially converting every audiofrequency information into square wave signals;
　　(2) determining the presence of the first square wave signal produced by the beginning of the first pulse of a phone pulse train;
　　(3) ignoring the presence of square wave signals during a first time period of approximately 50 milliseconds initiated as from the determination of the presence of said first square wave signal;
　　(4) determining the presence of the second square wave signal produced by the ending of said phone pulse, within a second time period of approximately 30 milliseconds initiated immediately after said first time period has elapsed;
　　(5) converting said first and second square wave signals into logic data or into a single pulse;
　　(6) ignoring the presence of square wave signals within a third time period of approximately 30 milliseconds initiated as from the determination of the presence of said second square wave signal;
　　(7) determining, should the beginning of an additional phone pulse take place, the presence of an additional square wave signal within a fourth time period of approximately 50 milliseconds initiated immediately after said third time period has elapsed;

(8) determining the presence of the second additional square wave signal produced by the ending of said additional phone pulse, as in steps 3 and 4;

(9) converting said first and second additional square wave signals produced by said additional phone pulse into new logic data or into a new single pulse;

(10) determining the presence of possible square wave additional signals produced by possible additional phone pulses, as in steps 6, 7 and 8;

(11) converting into logic data or single pulses said possible square wave additional signals produced by said possible additional phone pulses;

(12) determining the ending of a said phone pulse train when the presence of an additional square wave signal is not determined within a fourth time period or within a second time period;

(13) ignoring the presence of square wave signals within a time period of approximately 300 milliseconds initiated immediately after a said fourth time period has elapsed or within a time period of approximately 220 milliseconds initiated immediately after a said second time period has elapsed, when the presence of an additional square wave signal is not determined within a said fourth time period or within a said second time period;

(14) recycling back to step 2;

(D) applying said logic data or single pulses to commanding, ordering or informing means.

2. An apparatus for decoding audiofrequency information sent through rotary dialing from a calling phone set during the conversation period established with a called party over a phone line, wherein it comprises a signal limiting means capable of being connected to the phone line; an operational amplifier means coupled to said limiting means, said operational amplifier including a filter means for eliminating a portion of the signals received from said limiting means; a level regulator coupled to said operational amplifier means; a rectifier coupled to said level regulator; a trigger coupled to said rectifier; an integrator coupled to said trigger; and a counter with one input being connected to the output of said microprocessor and at least one output coupled to indicating means.

3. The apparatus for decoding audiofrequency information sent through rotary dialing from a calling phone set during the conversation period established with a called party over a phone line, wherein it comprises signal limiting means capable of being connected to the phone line and the output of said signal limiting means being connected to the input of operational amplifier means for eliminating a portion of said signals; the output of said operational amplifier means and of said filter means being coupled to the input of an operational amplifier connected in the follower mode with one output being coupled to the input of a rectifier and the output of the latter being connected to a trigger; the output of said trigger being coupled to the input of a integrator having a first output coupled to the input of a control means and a second output coupled to utilization means; finally, the output of said control means being connected to displaying means.

4. The apparatus for decoding information of claim 3, wherein at its input the apparatus has a transformer the primary of which is capable of being connected to the phone line and presents an impedance equivalent to that of an unhooked hand receiver, the transformer's secondary terminals being connected in parallel with said signal limiting means, which in turn comprise a capacitor, a resistor and a pair of Zener diodes connected in series therebetween and with opposite biasing; and, one of the secondary terminals of said transformer being ground-connected so that all processed signals have a common reference potential.

5. The apparatus for decoding information of claim 4, wherein said operational amplifier means comprises a first amplifier connected in the follower mode, with its input being coupled to the secondary terminals of said transformer through respective resistors and its output being connected to a pair of operational amplifiers in cascade with RC combinations each between the input and output of each one, configured as a bandpass filter; the outut of the last operational amplifier of the cascade having a variable resistor for input level adjusting of a fourth amplifier, which in turn is connected to a fifth amplifier with built-in rectifier means for eliminating one of the signal semi-cycles; a NAND-SCHMITT-TRIGGER gate with one input being connected to the output of said fifth amplifier and another input through one resistor to the power supply, the output of said NAND-SCHMITT-TRIGGER gate being connected to the input of said microprocessor and the output of the latter being connected to the input of a ten-output counter; at least one of the ten outputs of said counter being connected through a resistor to the base of a switching transistor which has the emitter ground-connected and the collector connected to lighting means connected in series with the power supply.

6. The apparatus for decoding information of claim 4, wherein said operational amplifier means comprises a first amplifier connected in the follower mode with its inputs connected to the secondary terminals of said transformer through respective resistors and its output connected to a pair of operational amplifiers in cascade with RC combinations each between the input and the output of each one, configured as a bandpass filter; the output of the last operational amplifier of the cascade being connected to a variable resistor for input level adjusting of a fourth amplifier which in turn is connected to a fifth amplifier with built-in rectifier means for eliminating one of the signal semi-cycles; a NAND-SCHMITT-TRIGGER gate with one input connected to the output of said fifth amplifier and another input through a resistor to the power supply; the output of said NAND-SCHMITT-TRIGGER gate being connected to the input of said microprocessor, one output of the latter being connected to audible means excited by a switching transistor and outputs coupled to a binary to seven segment decoder with outputs coupled to switching transistors connected in series with at least a seven segment character of a display.

7. The apparatus for decoding information of claim 5, wherein said lighting means is a filament lamp.

8. The apparatus for decoding information of claim 6, wherein said audible means is a piezoelectric buzzer.

9. The apparatus for decoding information of claim 2, wherein said level regulator is a variable resistor attenuator.

* * * * *